US009501761B2

(12) United States Patent
Richards et al.

(10) Patent No.: US 9,501,761 B2
(45) Date of Patent: Nov. 22, 2016

(54) SYSTEM AND METHOD FOR SHARING INVESTIGATION RESULTS

(71) Applicant: Palantir Technologies, Inc., Palo Alto, CA (US)

(72) Inventors: Kevin Richards, Menlo Park, CA (US); David Cohen, Palo Alto, CA (US); Khan Tasinga, Palo Alto, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 275 days.

(21) Appl. No.: 13/669,274

(22) Filed: Nov. 5, 2012

(65) Prior Publication Data
US 2014/0129936 A1 May 8, 2014

(51) Int. Cl.
*G06Q 10/10* (2012.01)
*G06F 21/62* (2013.01)
(Continued)

(52) U.S. Cl.
CPC .......... *G06Q 10/10* (2013.01); *G06F 21/6218* (2013.01); *G06F 21/84* (2013.01); *G06Q 50/265* (2013.01)

(58) Field of Classification Search
CPC ............ H04N 5/44543; H04N 21/4622; H04N 21/47; G11B 27/34; G11B 27/034
See application file for complete search history.

(56) References Cited

U.S. PATENT DOCUMENTS 4,881,179 A * 11/1989 Vincent ............... G06F 21/6218 358/1.14
5,241,625 A 8/1993 Epard et al.
(Continued)

FOREIGN PATENT DOCUMENTS

CN 102054015 5/2014
EP 1672527 6/2006
(Continued)

OTHER PUBLICATIONS

Intellectual Property Office of London, "Search Report" in application No. GB1319502.9, dated Apr. 15, 2014, 3 pages.
Current Claims in application No. GB1319502.9, dated Apr. 2014, 7 pages.
New Zealand Intellectual Property Office, "First Examination Report" in application No. 617128, dated Nov. 13, 2013, 2 pages.
Current Claims in application No. 617128, dated Nov. 2013, 7 pages.
(Continued)

*Primary Examiner* — Jeffrey A Gaffin
*Assistant Examiner* — Mandrita Brahmachari
(74) *Attorney, Agent, or Firm* — Hickman Palermo Becker Bingham LLP

(57) ABSTRACT

A computer-based investigative analysis system is disclosed in which a user can share results of an investigation with other users in a way that allows the sharing user to visualize how the results will be shared before they are shared. The results are shared in the form of a visual graph having nodes, edges, and other presentation elements. The nodes represent data objects that are the subject of the investigation and the edges represent connections between the data objects. The graph is shared in the form of an automatically generated redacted graph omitting nodes, edges, and presentation elements for which the other users do not have permission to view. Before sharing the graph, the sharing user is presented with a visualization of the automatically generated redacted graph providing the user an opportunity to confirm that sharing the redacted graph will not constitute an unauthorized information leakage.

11 Claims, 10 Drawing Sheets

(51) Int. Cl.
*G06F 21/84* (2013.01)
*G06Q 50/26* (2012.01)

(56) References Cited

U.S. PATENT DOCUMENTS

| | | | |
|---|---|---|---|
| 5,845,300 | A | 12/1998 | Comer |
| 6,065,026 | A | 5/2000 | Cornelia et al. |
| 6,237,138 | B1 | 5/2001 | Hameluck et al. |
| 6,243,706 | B1 | 6/2001 | Moreau et al. |
| 6,523,019 | B1 | 2/2003 | Borthwick |
| 6,944,777 | B1* | 9/2005 | Belani .............. H04L 63/101 707/999.009 |
| 6,944,821 | B1 | 9/2005 | Bates et al. |
| 7,174,377 | B2 | 2/2007 | Bernard et al. |
| 7,302,708 | B2* | 11/2007 | Kovarik, Jr. ................. 726/26 |
| 7,392,254 | B1 | 6/2008 | Jenkins |
| 7,530,105 | B2* | 5/2009 | Gilbert et al. ................. 726/22 |
| 7,716,140 | B1* | 5/2010 | Nielsen .............. G06F 21/6245 705/319 |
| 7,877,421 | B2 | 1/2011 | Berger et al. |
| 7,880,921 | B2 | 2/2011 | Dattilo et al. |
| 7,941,336 | B1* | 5/2011 | Robin-Jan ................. 705/7.13 |
| 8,073,857 | B2 | 12/2011 | Sreekanth |
| 8,302,855 | B2 | 11/2012 | Ma et al. |
| 8,732,574 | B2 | 5/2014 | Burr et al. |
| 8,984,390 | B2 | 3/2015 | Aymeloglu et al. |
| 2002/0032677 | A1 | 3/2002 | Morgenthaler et al. |
| 2002/0095360 | A1 | 7/2002 | Joao |
| 2002/0103705 | A1 | 8/2002 | Brady |
| 2004/0034570 | A1 | 2/2004 | Davis |
| 2004/0044648 | A1 | 3/2004 | Anfindsen et al. |
| 2004/0103147 | A1* | 5/2004 | Flesher et al. .............. 709/204 |
| 2004/0205492 | A1 | 10/2004 | Newsome |
| 2005/0010472 | A1 | 1/2005 | Quatse et al. |
| 2005/0039116 | A1 | 2/2005 | Slack-Smith |
| 2005/0091186 | A1 | 4/2005 | Elish |
| 2005/0097061 | A1* | 5/2005 | Shapiro et al. ............... 705/67 |
| 2006/0026561 | A1 | 2/2006 | Bauman et al. |
| 2006/0031779 | A1 | 2/2006 | Theurer et al. |
| 2006/0053170 | A1 | 3/2006 | Hill et al. |
| 2006/0136513 | A1 | 6/2006 | Ngo et al. |
| 2006/0143075 | A1 | 6/2006 | Carr et al. |
| 2006/0265377 | A1* | 11/2006 | Raman et al. ................. 707/9 |
| 2006/0265417 | A1 | 11/2006 | Amato et al. |
| 2006/0271526 | A1* | 11/2006 | Charnock et al. ............. 707/3 |
| 2006/0277460 | A1 | 12/2006 | Forstall et al. |
| 2007/0000999 | A1 | 1/2007 | Kubo et al. |
| 2007/0018986 | A1* | 1/2007 | Hauser .............. G06T 11/206 345/440 |
| 2007/0061752 | A1 | 3/2007 | Cory |
| 2007/0245339 | A1 | 10/2007 | Bauman et al. |
| 2007/0284433 | A1 | 12/2007 | Domenica et al. |
| 2007/0299697 | A1 | 12/2007 | Friedlander et al. |
| 2008/0016155 | A1 | 1/2008 | Khalatian |
| 2008/0109714 | A1 | 5/2008 | Kumar et al. |
| 2008/0313132 | A1 | 12/2008 | Hao et al. |
| 2009/0024946 | A1* | 1/2009 | Gotz ............................ 715/769 |
| 2009/0089651 | A1 | 4/2009 | Herberger et al. |
| 2009/0106178 | A1 | 4/2009 | Chu |
| 2009/0112745 | A1 | 4/2009 | Stefanescu |
| 2009/0150868 | A1 | 6/2009 | Chakra et al. |
| 2009/0187546 | A1 | 7/2009 | Whyte et al. |
| 2009/0199106 | A1 | 8/2009 | Jonsson et al. |
| 2009/0249244 | A1 | 10/2009 | Robinson et al. |
| 2009/0271343 | A1 | 10/2009 | Vaiciulis et al. |
| 2009/0282068 | A1 | 11/2009 | Shockro et al. |
| 2009/0313463 | A1 | 12/2009 | Pang et al. |
| 2010/0057622 | A1 | 3/2010 | Faith et al. |
| 2010/0098318 | A1 | 4/2010 | Anderson |
| 2010/0169137 | A1* | 7/2010 | Jastrebski et al. ............. 705/7 |
| 2010/0223260 | A1 | 9/2010 | Wu |
| 2010/0313239 | A1* | 12/2010 | Chakra et al. ................ 726/2 |
| 2011/0099133 | A1 | 4/2011 | Chang et al. |
| 2011/0225482 | A1 | 9/2011 | Chan et al. |
| 2012/0188252 | A1 | 7/2012 | Law |
| 2013/0124567 | A1* | 5/2013 | Balinsky .......... G06F 17/30011 707/783 |
| 2013/0151453 | A1 | 6/2013 | Bhanot et al. |
| 2013/0166480 | A1 | 6/2013 | Popescu et al. |
| 2014/0129936 | A1 | 5/2014 | Richards |
| 2014/0222793 | A1 | 8/2014 | Sadkin et al. |
| 2015/0106379 | A1 | 4/2015 | Elliot et al. |

FOREIGN PATENT DOCUMENTS

| | | |
|---|---|---|
| WO | WO 01/25906 | 4/2001 |
| WO | WO 2010/030914 | 3/2010 |
| WO | WO 2012/119008 A2 | 9/2012 |

OTHER PUBLICATIONS

Abbey, Kristen, "Review of Google Docs," May 1, 2007, pp. 2.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
Bluttman et al., "Excel Formulas and Functions for Dummies," 2005, Wiley Publishing, Inc., pp. 280, 284-286.
Conner, Nancy, "Google Apps: The Missing Manual," May 1, 2008, pp. 15.
Galliford, Miles, "SnagIt Versus Free Screen Capture Software: Critical Tools for Website Owners," <http://www.subhub.com/articles/free-screen-capture-software>, Mar. 27, 2008, pp. 11.
"GrabUp—What a Timesaver!" <http://atlchris.com/191/grabup/>, Aug. 11, 2008, pp. 3.
Gu et al., "Record Linkage: Current Practice and Future Directions," Jan. 15, 2004, pp. 32.
Hua et al., "A Multi-attribute Data Structure with Parallel Bloom Filters for Network Services" HiPC 2006, LNCS 4297, pp. 277-288, 2006.
JetScreenshot.com, "Share Screenshots via Internet in Seconds," <http://web.archive.org/web/20130807164204/http://www.jetscreenshot.com/>, Aug. 7, 2013, pp. 1.
Kwout, <http://web.archive.org/web/20080905132448/http://www.kwout.com/> Sep. 5, 2008, pp. 2.
Microsoft, "Registering an Application to a URI Scheme," <http://msdn.microsoft.com/en-us/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.
Microsoft Windows, "Microsoft Windows Version 2002 Print Out 2," 2002, pp. 1-6.
Nitro, "Trick: How to Capture a Screenshot as PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Online Tech Tips, "Clip2Net—Share files, folders and screenshots easily," <http://www.online-tech-tips.com/free-software-downloads/share-files-folders-screenshots/>, Apr. 2, 2008, pp. 5.
O'Reilly.com, <http://oreilly.com/digitalmedia/2006/01/01/mac-os-x-screenshot-secrets.html> published Jan. 1, 2006 in 10 pages.
Schroder, Stan, "15 Ways to Create Website Screenshots," <http://mashable.com/2007/08/24/web-screenshots/>, Aug. 24, 2007, pp. 2.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
SnagIt, "SnagIt 8.1.0 Print Out," Software release date Jun. 15, 2006, pp. 6.
SnagIt, "SnagIt 8.1.0 Print Out 2," Software release date Jun. 15, 2006, pp. 1-3.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.
Official Communication for Great Britain Patent Application No. 1404486.1 dated Aug. 27, 2014.
Official Communication for Great Britain Patent Application No. 1404499.4 dated Aug. 20, 2014.
Official Communication for Great Britain Patent Application No. 1404489.5 dated Aug. 27, 2014.

(56) References Cited

OTHER PUBLICATIONS

Official Communication for New Zealand Patent Application No. 622473 dated Mar. 27, 2014.
Official Communication for New Zealand Patent Application No. 622473 dated Jun. 19, 2014.
Official Communication for New Zealand Patent Application No. 628161 dated Aug. 25, 2014.
Official Communication for Australian Patent Application No. 2013251186 dated Mar. 12, 2015.
Claims in Australian Patent Application No. 2013251186 dated Mar. 2015, 7 pages.
RedSeal, "RedSeal Your Network Against Cyber Attacks", www.redsealnetworks.com, dated 2015, 3 pages.
U.S. Appl. No. 14/265,637, filed Apr. 30, 2014, Notice of Allowance, Feb. 13, 2015.
U.S. Appl. No. 14/571,098, filed Dec. 15, 2014, First Office Action Interview, Mar. 11, 2015.

* cited by examiner

SYSTEM AND METHOD FOR SHARING INVESTIGATION RESULTS

COPYRIGHT STATEMENT

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. Copyright 2012, Palantir Technologies, Inc.

TECHNICAL FIELD

The present disclosure relates generally to computer systems for investigative analysis and, more particularly, to the design and use of computer systems for sharing investigation results produced by one user with other users.

BACKGROUND

The increased sophistication of computing, including artificial intelligence, data mining, statistics, machine learning, and database systems, requires a better paradigm for computer-based investigative analysis. The deficiencies of data mining—the use of statistical algorithms to extract patterns and insight from raw data—are an important catalyst for the new requirements for investigative analysis systems. With data mining, using computers to detect credit card fraud, to recommend the next movie to rent, or to find a good place to eat in a new city have become a part of our daily life.

However, data mining has limitations for use as an investigative analysis technique. From a technical perspective, automated data mining techniques are well-suited when the nature and composition of the underlying data does not change over time, the data is complete and clean, and the querier has some idea what he or she is looking for.

Unfortunately, many of hardest, most complex, and critical data problems that exist today do not have data characteristics that are well-suited for data mining techniques. These problems tend to involve data that comes from many disparate sources, is incomplete and inconsistent, and is created by those who are trying to avoid leaving a trail that is easy to follow. Further complicating matters, these problems are often bound up with social and privacy concerns. People generally are uncomfortable having a computer being a final arbiter when lives or livelihoods are on the line. Examples of where such problems can be found include fields such as intelligence analysis and police investigations. With these types of data problems, automated algorithmic approaches are sub-optimal because they omit human involvement at critical steps.

Accordingly, a need remains in the art for an investigative analysis system that addresses these and other issues.

SUMMARY

The above deficiencies and other problems associated with using data mining techniques for certain investigative analyses are reduced or eliminated by the disclosed investigative analysis system.

In some embodiments, a user of the system can share results of an investigation on a body of data with other users in a way that allows the sharing user to visualize how the results will be shared with the other users before they are shared. In some embodiments, the results of the investigation are shared in the form of a visual graph having nodes and edges. In some embodiments, the visual graph also has other presentation elements (e.g., non-node and non-edge components) in addition to nodes and edges. These other presentation elements may include textual notes, property boxes, audio content, video content, audio/video content, documents, or other presentable information. In some embodiments, the nodes of the graph represent data objects that are the subject of the investigation and the edges represent connections between the data objects. In some embodiments, the graph is shared with the other users in the form of an automatically generated redacted graph omitting nodes, edges, and/or other presentation elements for which the other users do not have permission to view. In some embodiments, the sharing user is presented with a visualization of the automatically generated redacted graph before it is shared with the other users providing the sharing user an opportunity to confirm that sharing the redacted graph with the other users will not constitute an information leakage and to confirm that the redacted graph will be meaningful to the other users' investigations. By doing so, the superior pattern matching and inference machinery of the human brain is involved in the decision of whether the results of one user's investigation are appropriate to share with other users.

BRIEF DESCRIPTION OF DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENT(S)

Introduction

Figure 1A:
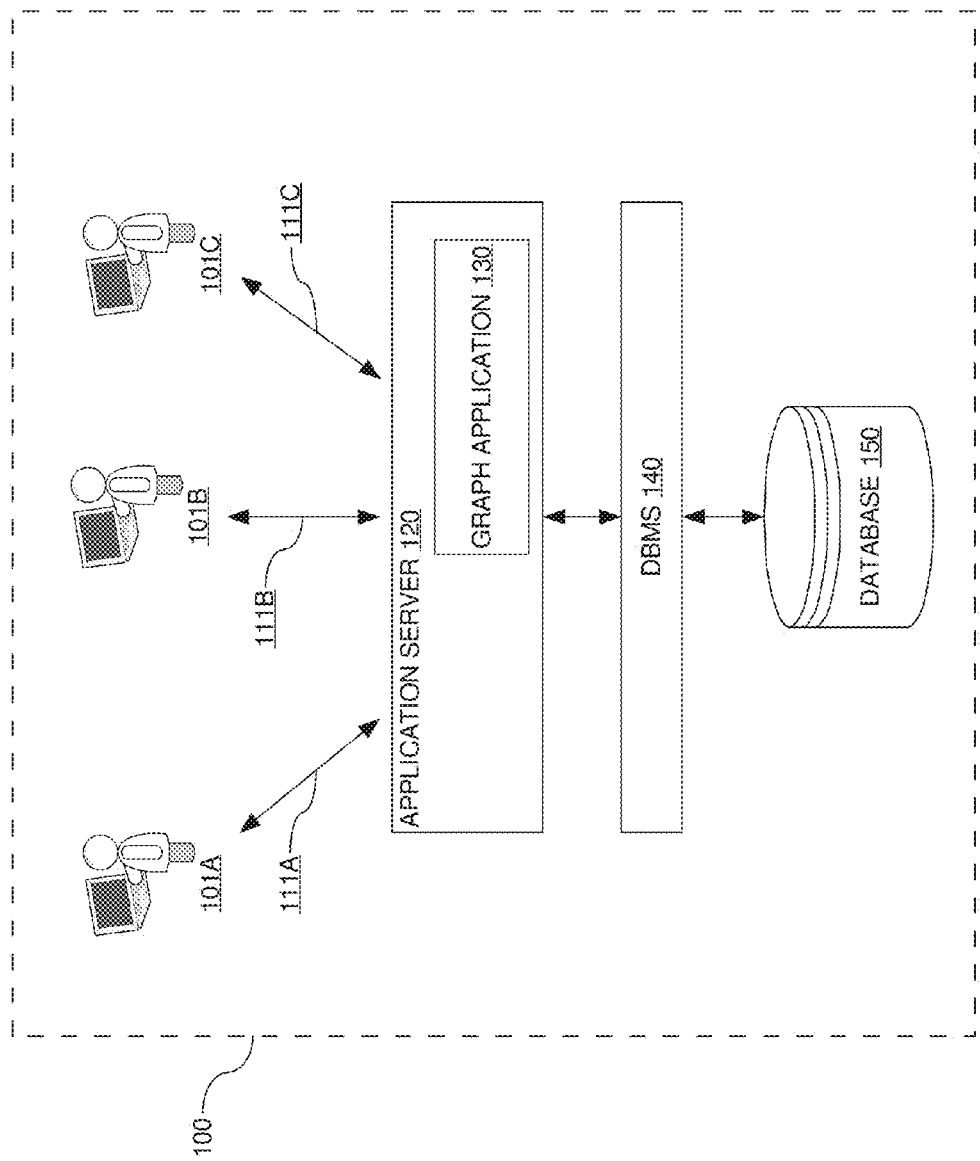
FIG. 1A is a block diagram of a graph sharing investigative analysis system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be understood that, although the terms first, second, etc. may be used herein to describe various elements, these elements should not be limited by these terms. These terms are only used to distinguish one element from another. For example, a first graph could be termed a second graph, and, similarly, a second graph could be termed a first graph, without departing from the scope of the present invention. The first graph and the second graph are both graphs, but they are not the same graph.

The terminology used herein is for the purpose of describing particular embodiments only and is not intended to be limiting of the invention. As used herein, the singular forms "a", "an", and "the" are intended to include the plural forms as well, unless the context clearly indicates otherwise. Use of "criteria" may indicate either or both of the singular usage of the term, "criterion", or the plural form "criteria", or vice versa.

It will also be understood that the term "and/or" as used herein refers to and encompasses any and all possible combinations of one or more of the associated listed items. It will be further understood that the terms "comprises" and/or "comprising", when used herein, specify the presence of stated features, integers, steps, operations, elements, components and/or groups, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event" or "in response to detecting [the stated condition or event]," depending on the context.

Overview

In general, the present disclosure relates to an investigative analysis system in which a user can share results of an investigation with other users in a way that allows the sharing user to visualize how the results will be shared with the other users before they are shared. In some embodiments, the results of the investigation are shared in the form of a visual graph having nodes and edges.

In some embodiments, the visual graph also has other presentation elements (e.g., non-node and non-edge components) in addition to nodes and edges. These other presentation elements may include textual notes, property boxes, audio content, video content, audio/video content, documents, or other presentable information.

In some embodiments, the nodes of the graph represent data objects that are the subject of the investigation and the edges represent connections between the data objects.

In some embodiments, the graph is shared with the other users in the form of an automatically generated redacted graph omitting nodes, edges, and/or other presentation elements for which the other users do not have permission to view.

In some embodiments, the sharing user is presented with a visualization of the automatically generated redacted graph before it is shared with the other users providing the sharing user an opportunity to confirm that sharing the redacted graph with the other users will not constitute an information leakage and to confirm that the redacted graph will be meaningful to the other users' investigations. By doing so, the superior pattern matching and inference machinery of the human brain is involved in the decision of whether the results of one user's investigation are appropriate to share with other users.

Graph Sharing Investigative Analysis System

In some embodiments, the present disclosure relates to an investigative analysis system in which a user can share results of an investigation with other users in a way that allows the sharing user to visualize how the results will be shared with the other users before they are shared. By doing so, the system allows the sharing user to visual confirm that sharing the graph would not represent an information leakage and, at the same, will provide meaningful information to the other users.

An example investigative analysis system 100 is illustrated in FIG. 1A. As shown, the system 100 includes one or more user sites 101A-C operatively coupled respectively by one or more network communication links 111A-C to an application server 120 that hosts a graph application 130. The graph application 130, as part of the application server 120, accesses a database 150 by way of a database management system 140. User sites 101A-C and server 120 may comprise one or more computers that host or execute logic or stored programs configured to perform the processes that are further described herein.

A user at a user site 101 conducts, using a computing device at the site 101, an investigation involving data objects stored in the database 150. Generally, an investigation is a separate line of inquiry or analysis on a subset of shared database data drawn from a shared data repository in the database 150. Investigations allow users at user sites 101 to explore competing hypotheses. For example, if the user at site 101A has a first hypothesis regarding a subset of database data, and the user at site 101B has a second competing hypothesis regarding the same subset of database data, investigations allow both analysts to pursue their own hypothesis on the subset without interfering or contradicting each other.

During an investigation, changes made to the subset of data of the investigation are not visible to other users at other user sites 101 and do not conflict with changes to the subset made by other users at other user sites 101 either in another investigation or to the base copy of the subset in the shared data repository of the database 150 from which the investigation subset was drawn.

Changes made during an investigation are made visible to other users at other sites 101 by publishing the changes to the shared data repository of the database 150. Publishing changes to the shared data repository may require reconciliation with other changes made outside the context of the investigation. In some cases, reconciliation occurs automatically. In other cases, manual reconciliation is required.

In some embodiments, a user at a site 101, using the graph application 130, may produce, in the context of an investigation the user is conducting, results of the investigation in the form of a graph that reflects changes made during the investigation. The graph may be created with the use of graph application 130 and stored in a computer memory. Among other functions, the graph application 130 drives an interactive user interface presented on a video display at a user site 101 (e.g., a computer monitor). Among other features, the user interface allows a user at the user site 101 to visualize data objects that are the subject of the investigation by plotting each data object as a separate node of the graph and displaying any known connections between each data object as edges connecting the nodes. For example, an edge of the graph connecting two nodes may represent a shared property, a personal relationship, or mutual participation in an event. As another possible feature, the user interface may allow the user at the user site 101 to create a new association between two data objects in the investigation by dragging (e.g., with a pointing device or with a finger or stylus applied to a touch screen) a line between the two nodes of the graph representing the two data objects.

In some embodiments, a user at a user site 101 can publish a graph created during an investigation to a graph repository in the database 150 where other users at other sites 101 can retrieve the published graph into their own investigations for further analysis. In this way, a user at one user site 101 can share results of investigation with other users at other sites 101. This process can continue as the analysis is handed back and forth between investigative teams.

As a particular example, a user at user site 101A can publish a first graph to the graph repository. Another user at user site 101B can bring the first graph into another investigation whereupon a second graph based on the first graph is published back to the graph repository. From there, the user at user site 101A can retrieve the second graph into his or her investigation to continue the analysis based on the second graph created by the user at user site 101B. The publishing, bringing and receiving involve networked communication of data between the computers involved in the interactions that are described.

In some embodiments, the graph application 130 drives an interactive graph sharing user interface presented on a video display at a user site 101 that allows a user at the user site 101 to publish a graph created during an investigation to the graph repository. In some embodiments, the graph sharing user interface allows the user to specify other users that are to receive the graph. Based on the users specified, the graph application 130 automatically creates a redacted version of the graph in which nodes and edges that the specified users do not have permission to view are redacted. The graph application 130 presents the redacted graph on the video display to allow the publishing user to confirm the contents of the redacted graph before publishing the redacted graph to the graph repository. If the publishing user is satisfied with the contents of the redacted graph, the publishing user can command the graph application 130 through the user interface to publish the redacted graph to the graph repository.

As a particular example, an intelligence analyst at a user site 101A in country or state A may wish to share results of an investigation with another intelligence analyst at a user site 101B in another country or state B. With the graph application 130, the intelligence analyst of jurisdiction A can visually confirm contents of a redacted graph to be shared with the intelligence analyst of jurisdiction B does not represent an information leakage and, at the same time, represents investigative results useful to the intelligence analyst of jurisdiction B.

At each user site 101 there is a client computing device used by a user at that site that communicates and exchanges data with the application server 120 over a network communication link 111. The client computing device may be virtually any client computer such as workstation computer, a laptop computer, a tablet computer, a mobile phone, or other client computing device that has or is operatively coupled to a video display. While only three user sites 101 are shown in FIG. 1A, the system 100 may include more than three or less than three user sites 101.

A network communication link 111 may traverse one or more data networks (e.g., Local Area Networks and Wide Area Networks). A network communication link 111 may be based on a reliable network transport protocol such as TCP/IP or the like. A network communication link 111 between a user site 101 and the application server 120 may be established as and when needed, for example, when the application server 102 or the client computing device at the user site 101 needs to send data to the other. Alternatively, the network communication link 111 may span the life of a session during which data is sent back and forth between the application server 120 and the user site 101 in multiple communication exchanges. Either the application 120 or the client computing device at the user site 101 may initiate establishment of the network communication link 111. A network communication link 111 may traverse a number of intermediary devices (e.g., web servers, cache servers, proxy servers, content delivery network servers, etc.) between an application server 120 device and the client computing device at the user site 101. In this case, the network communication link 111 may be viewed as a logical network communication link made up of a number of sub-network communication links connecting the client computing device to the application server 120 device through the intermediary devices in a network.

The client computing device at the user site 101 is configured with a Web browsing application or other client application for performing client functions of the graph application 130. Among others, the client functions include presenting various graph application 130 user interfaces on the video display of the client computing device, as instructed over one or more network communication links 111 by the graph application 130. The client functions may also include receiving user input from the user of the client computing device and transmitting data representing user input to the graph application 130 over one or more network communication links 111. The graph application 130 may instruct the client application to present the various graph application user interface using standardized Web instructions sent over one or more network communications links 111 to the client computing device. Such Web instructions may involve standardized Web protocols (e.g., HTTP, HTTPS, etc.) and include standardized markup language instructions (e.g., XML, HTML, XHTML, etc.), standardized style sheet language instructions (e.g., CSS, etc.), and standardized client-side scripting language instructions (e.g., JavaScript®, ActionScript®, and Jscript®, etc.). Receipt of data by the graph application 130 representing user input may also involve standardized Web protocols and standardized Web instructions.

The application server 120 contains the graph application 130 and operates on one or more server computing devices. The server computing devices on which the graph application 130 operates may be considered to be operatively coupled to the video displays at user sites 101 by network communication links 111 and the client computing devices at the user sites 101. The application server 120 provides fundamental application data services to the graph application 130 such as handling network communications with user sites 101 and providing an interface to the graph application 130 for communicating with the database management service 140. According to some aspects of the present invention, the graph application 130 is implemented using the Java programming language. However, implementation with other programming languages or in hardware (e.g., hard-wired logic, one or more ASICs or FPGAs, firmware, etc.) are also possible.

Graph Sharing Application

Figure 1B:
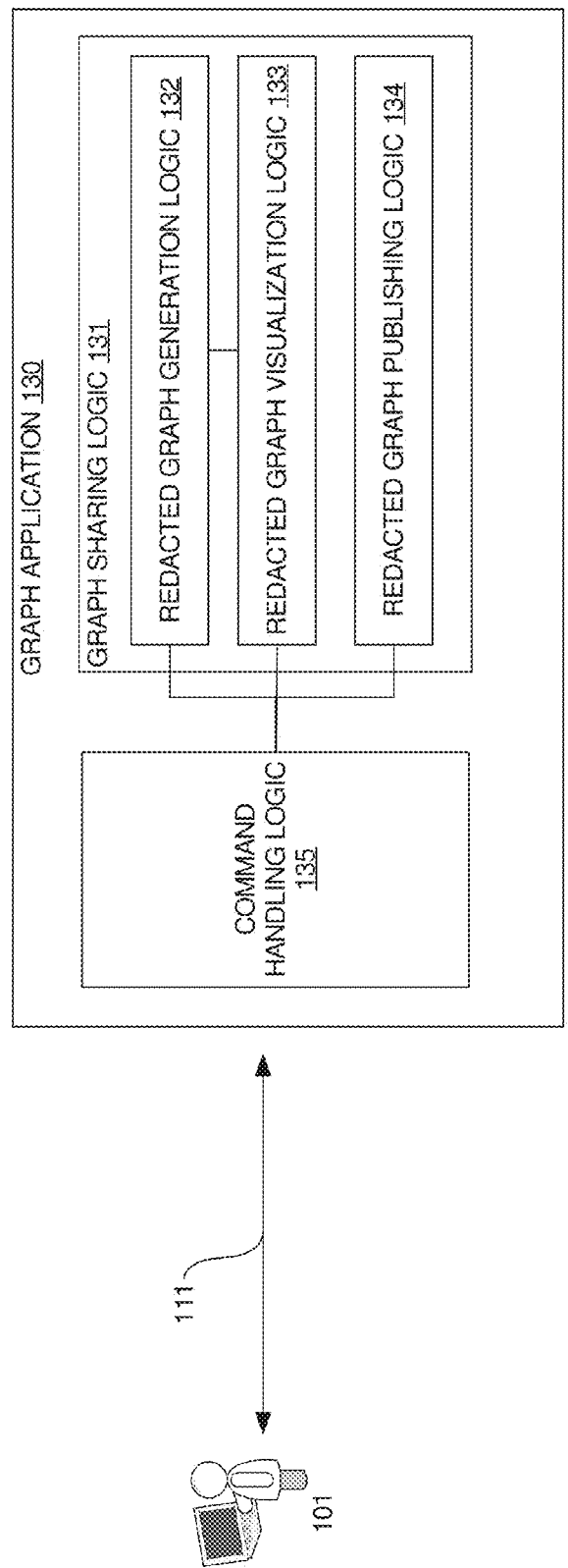
FIG. 1B is a block diagram of a graph sharing application of the investigative analysis system.

FIG. 1B is a block diagram of an embodiment of the graph application 130. As shown, the graph application 130 includes a number of logic elements which may be implemented in software or hardware or a combination of the two. A graph sharing logic element 131 includes a redacted graph generation logic element 132 for generating a redacted graph, a redacted graph visualization logic element 133 for displaying a redacted graph on a video display at a user site 101 operatively coupled to the graph application 130 by a network communication link 111, and a redacted graph publishing logic element 134 for publishing a redacted graph to the graph repository of the database 150. The graph application 130 also includes a command handling logic element 135 for receiving notification of commands input by a user through user interface controls presented on the video display at the user site 101 and for dispatching received commands to the appropriate logic element of the graph application 130 to handle the command. The graph application 130 may include these and other logic elements.

Although in some embodiments the redacted graph generation, visualization, and publishing functions are performed at least in part by a graph application hosted by an application server, some or all of these functions may be performed by the computing devices at the user sites. For example, the computing devices may be configured with a graph application for performing some or all of these functions.

In an embodiment, operating on the database 150 (i.e., the organized information actually stored on a storage device) is a database management service (DBMS) 140 that, among other operations, processes requests from the application server 120 for access to information in the database 150. The graph application 130 may interact indirectly with the database 150 through the DBMS 140 that in turn interacts directly with the database 150 to provide high level database operations to the graph application 130, such as retrieval and storage of information in the database 150. No particular type of database management service is required and any database management service capable of supporting the graph sharing techniques described herein may be used. In some embodiments, as examples, the DBMS 140 is a relational database management system such as those commercially available from Oracle Corporation of Redwood Shores, Calif. and Microsoft Corporation of Redmond, Wash. Other embodiments may use open source databases.

In some embodiments, the database 150 (or a portion or portions thereof) is stored in volatile memory for faster data access to database data. In this case, the database 150 may be backed by a shadow copy of the database 150 stored in a non-volatile memory in case of power loss to the volatile memory.

Graph Sharing Database

Figure 1C:
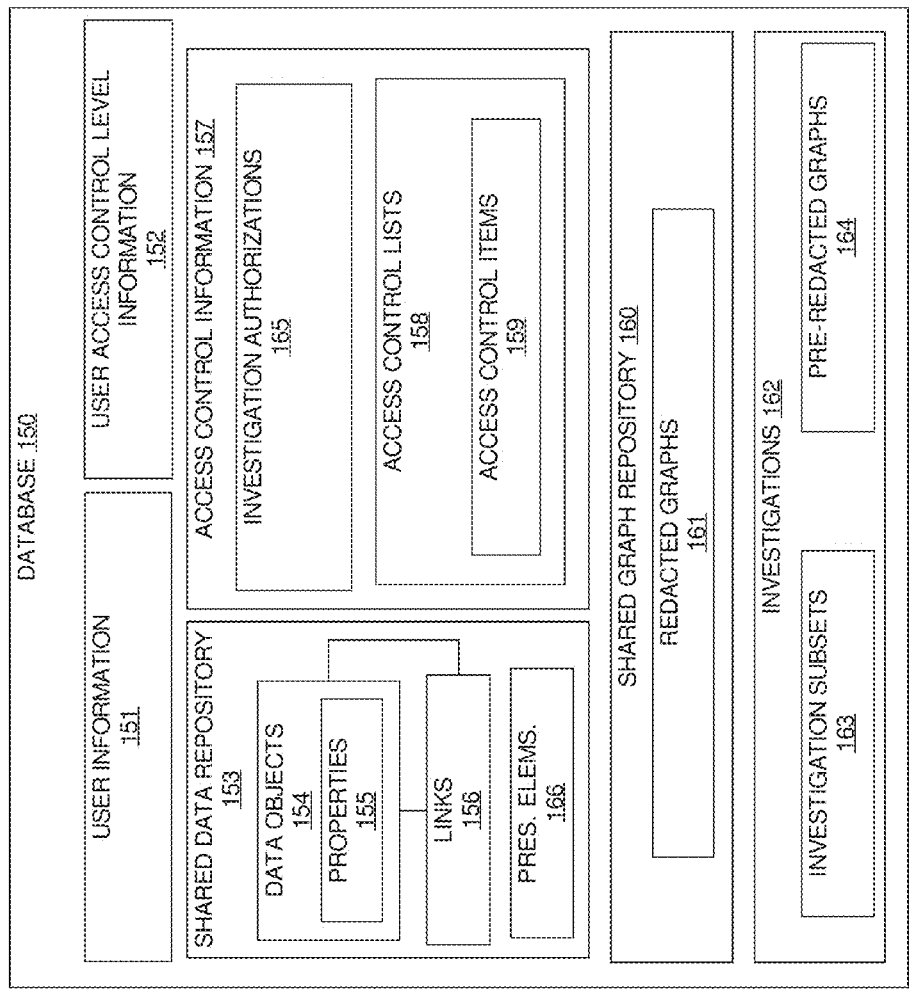
FIG. 1C is a block diagram of a graph sharing database of the investigative analysis system.

FIG. 1C is a block diagram of information stored in the database 150 involved in sharing graph operations in an embodiment. Conceptually, the database 150 is segmented into user information 151, user access control level information 151, a shared data repository 153, a shared graph repository 160, and investigation data 162. No particular type of database is required and any database capable of supporting the graph sharing techniques described herein may be used. As just one non-limiting example, the database 150 is a relational database. The information stored in the database 150 may also be stored as a result of performing graph sharing operations in computer memory of the server computing devices that operate the graph sharing application 130 and in computer memory of client computing devices at user sites 101.

User information 151 includes data identifying individual users of the graph sharing application 130. Such data may include user identification information uniquely identifying individual users and credential information for authenticating individual users. Credential information may include username and password information and/or cryptographic digital certificate information as examples. User information 151 may also include collaboration team data. A collaboration team is a set of one or more users identified by a team name. Collaboration teams allow reference to a set of one or more individual users by a single identifier akin to e-mail messaging groups.

User access control level information 152 includes information identifying which access control levels users have. In some embodiments, there are two types of access control levels: groups and classifications. Groups may also be referred to as roles. The access control groups to which a user belongs determine what operations the user can perform on which data in the shared data repository 153. The access control groups to which a user belongs also determine what data in the shared data repository 153 the user can bring into an investigation 162. The access control classifications a user has determines what data in the shared data repository 153 the user has access to and what data in the shared data repository 153 the user can bring into an investigation 162.

A user may belong to more than one access control group and have more than one access control classification. Access control groups and access control classifications may be hierarchical such that, if a user belongs to an access control group or has an access control classification higher in the hierarchy, then the user implicitly belongs to all groups and has all classifications lower than that group or classification in the hierarchy.

Access control groups and access control classifications may be associated with properties 155, links 156, and other presentation elements 166 through access control lists 158. An access control list 158 has a set of one or more access control items 159. An access control item 159 can specify an access control group or a classification.

When specifying an access control group, an access control item 159 includes an access control group name or identifier and a permission of that access control group. In some embodiments, there are four permissions levels: discovery, read, write, and owner. With the discovery permission, a user can be notified of and know that data exists but cannot view the data. With the read permission, a user can find and read the data but cannot change the data. With the write permission, a user can find, read, and change the data. With the owner permission, a user can find, read, change, and adjust the permissions on the data. Thus, permissions may be cumulative. For example, a user that has the write permission with respect to data implicitly also has the read and discovery permissions with respect to that data. Embodiments are not limited to these four permission levels and other sets of permissions levels may be used.

When specifying an access control classification, an access control item 159 includes a classification marking that identifies the classification. Example classification markings include Top Secret (TS), Secret (S), Confidential (C), Restricted (R), and Unclassified (U). In an embodiment, a user is not allowed access to data in the shared data repository 153 unless the user has all classification markings specified in the access control list 158 associated with the data. Thus, in such an embodiment, classification access control items 159 of an access control list 158 override any permissions granted to a user by group access control items 159 of the access control list 158. The foregoing classification markings are NOTIONAL ONLY and provided solely for example purposes. As explained in greater detail below, access control information 157 associated with data objects 154 and links 156 that are the subject of an investigation may be used when sharing a graph to determine what nodes and edges of the graph to redact.

In some embodiments, investigative data stored in the shared data repository 153 is conceptually structured according to an object-centric data model. At the highest level of abstraction, there are data objects 154. A data object 154 is a container for information representing things in the world. For example, a data object 154 can represent an entity such as a person, a place, an organization, or other noun, or an event that happens at a point in time or for a duration, a document or other unstructured data source such as an e-mail message, a news report, or a written paper or article, or a digital media item such as audio or video. A data object 154 may have a type (e.g., Person, Event, or Document) and a display name which may be values of particular properties 155 of the data object 154.

Each data object 154 may have one or more properties 155. Properties 155 are attributes of the data object 154 that represent individual data items. Each property 155 of a data object 154 has a type and a value. Different types of data objects 154 may have different types of properties 155. For example, a Person data object 154 might have an Eye Color property 155 and an Event object 154 might have a Date property 155.

In some embodiments, the set of data object types and the set of property types for each type of data object are defined according to a pre-defined or user-defined ontology or other hierarchical structuring of knowledge through sub-categorization of object types and property types according to their relevant and/or cognitive qualities. A data object 154 may also be allowed to have more than one property 155 of the same type. For example, a Person data object 154 might have multiple Address properties 155 or multiple Name properties 155.

A link 156 represents a connection between two data objects 154. In some embodiments, the connection is either through a relationship, an event, or through matching properties.

A relationship connection may be asymmetrical or symmetrical. For example, Person data object A may be connected to Person data object B by a Child Of relationship (where Person data object B has an asymmetric Parent Of relationship to Person data object A), a Kin Of symmetric relationship to Person data object C, and an asymmetric Member Of relationship to Organization data object X. The type of relationship between two data objects may vary depending on the types of the data objects. For example, Person data object A may have an Appear In relationship with Document data object Y or have a Participate In relationship with Event data object E.

As an example of an event connection, two Person data objects 154 may be connected by an Airline Flight data object 154 representing a particular airline flight if they traveled together on that flight, or by a Meeting data object 154 representing a particular meeting if they both attended that meeting. In an embodiment, when two data objects 154 are connected by an event, they are also connected by relationships, in which each object 154 has a specific relationship to the event, such as, for example, an Appears In relationship.

As an example of a matching properties connection, two Person data objects 154 representing a brother and a sister, may both have an Address property 155 that indicates where they live. If the brother and the sister live in the same home, then their Address properties 155 likely contain similar, if not identical information. In an embodiment, a link 156 between two data objects 154 may be established based on similar or matching properties 155 of the data objects 154.

The above are just some examples of the types of connections that may be represented by a link 156 and other types of connections may be represented. Thus, it should be understood that embodiments are not limited to any particular types of connections between data objects 154. For example, a document data object 154 might contain two different tagged entities. A link 156 between two data objects 154 may represent a connection between these two entities through their co-occurrence within the same document.

In some embodiments, the shared data repository 153 stores other presentation elements 166 that are not data objects 154, properties 155, or links 156. These other presentation elements 166 may include textual notes, property boxes, audio content, video content, audio/video content, documents, or other presentable information. These other presentation elements 166 are referred to as "presentation" elements because they may be presented on a graph in addition to nodes and edges representing data objects 154 and links 156, respectively. It should be understood that it is not a requirement that presentation elements 166 and data objects 154 represent different types of information. Information represented by a presentation element 166 can instead by represented by a data object 154, and vice versa. For example, a document may be represented by a presentation element 166 and/or a data object 154.

In some embodiments, a property 155, a link 156, or a presentation element 166 may be associated with an access control list 158 that governs access users have to the property 155, link 156, or presentation element 166. In some embodiments, the level of access a user has to a property 155 or link 156 also affects the level of access the user has to a data object 154 associated with the property 155 or link 156. In particular, to view a data object 154, a user must have view access to at least one property 155 of that data object 154. If the user has view access to a link 156 from one data object 154 to another data object 154 but no view access to any properties 155 of the data object 154, then the user can view the data object 154 but it in a generic form that does not reveal any details of the data object 154. In some embodiments, to view a property 155 of a data object 154, a user must have at least read level access to that property 155. In some embodiments, to view a link 156, the user must have at least read level access to that link 156. In some embodiments, to view a presentation element 166, the user must have at least read level access to that presentation element 166.

Graph-Based Investigations

In some embodiments, a user at a user site 101 can use the graph application 130 to conduct a separate line of inquiry or analysis on a subset 163 of data objects 154, properties 155, links 156, and presentation elements 166 drawn from the shared data repository 153. This separate line of inquiry or analysis is referred to herein as an investigation 162. During an investigation 162, changes made to the investigation subset 163 of the investigation 162 are not visible to other users at other user sites 101 and do not conflict with changes to the data objects 154, the properties 155, the links 156, and the presentation elements 166 of the investigative subset 163 made by other users at other user sites 101 either in another investigation 162 or to the base copies of the data objects 154, the properties 155, the links 156, and the presentation elements 166 in the shared data repository 153 from which the investigation subset 163 was drawn. Changes made during an investigation 162 are made visible to other users at other sites 101 by "publishing" the changes to the shared data repository 153.

Investigation Authorizations

In some embodiments, the set of data objects 154, properties 155, links 156, and presentation elements 166 in the shared data repository 153 that can be drawn into a user's investigative subset 163 is constrained by investigation authorizations 165. An investigation authorization 165 is a set of access control groups and/or a set of access control classifications. An investigation authorization 165 is associated with an investigation 162 and represents the effective permission for the associated investigation 162. The effective permission determines the kind of data that can be drawn from the shared data repository 153 into the investigation 162. For example, if the investigation authorization 165 has the "Everyone" and the "Finance" group, only data in the shared data repository 153 that is authorized for Everyone, Finance, or for both can be brought into the investigation 162.

As a result of an associated investigation authorization 165, an investigation 162 may contain data authorized by each group or classification in the investigation authorization 165. In some embodiments, for a user to gain access to an investigation 162, the user, according to the user's user access control level information 152, must have at least the same set of access control groups and access control classifications as specified in the associated investigation authorization 165.

Pre-Redacted Graphs

In the context of an investigation 162, a user at a user site 101 can use the graph application 130 to make changes to the investigation subset 163 of the investigation 162 by creating and storing a graph 164. Like the investigation subset 163, the graph 164 is local to the investigation 162 until it is published to the shared graph repository 160. In some embodiments, a graph 164 created in the context of an investigation may be published to the shared graph repository 160 as a redacted graph 161 in which one or more nodes, edges, and/or other presentation elements 166 of the graph 164 created in the context of the investigation are redacted. In this sense, the graph 164 created in the investigation 162 may conceptually viewed as a pre-redacted graph 164.

For making changes to the investigation subset 163, the graph application 130 drives a user interface allowing the user to navigate and work with the contents of a graph 164. Among other possible features, the user interface may allow a user to add and remove data objects 154 to and from the graph 164, create and remove links 156 between data objects 154 of the graph 164, add and remove presentation element 166, and organize and format the graph 164 for presentation.

A pre-redacted graph 164 of an investigation 162 may be a collection of nodes, edges therebetween, and presentation elements 166. Each node of a pre-redacted graph 164 corresponds to a data object 154 that is the subject of the investigation 162. Each edge of the pre-redacted graph 164 corresponds to a link 156 established between two data objects 154 that are the subject of the investigation 162. Each presentation element 166 of the pre-redacted corresponds to a presentation element 166 that is the subject of the investigation 162.

Graph State Information

A pre-redacted graph 164 of an investigation 162 may be stored in the database 150 by the graph application 130 as "graph state information". Graph state information includes information for displaying the nodes, edges, and other presentation elements of the graph on a video display. Graph state information may include such information as two-dimensional positioning information for positioning the nodes and other presentation elements of the graph on the video display and link information indicating the nodes that are to be displayed with edges drawn there between. The graph state information may include other information such as a name of the graph and a description.

In some embodiments, graph state information for a pre-redacted graph 164 does not contain the data objects 154, links 156, and presentation elements 166 represented by the pre-redacted graph 164. Instead, the graph state information contains pointers or references to the represented data objects 154, links 156, and presentation elements 166 of the investigation subset 163. Consequently, deleting or modifying the graph state information for a pre-redacted graph 164, as an operation by itself, does not delete or modify the underlying data objects 154, links 156, and presentation elements 166 represented by the pre-redacted graph 164.

Publishing a Graph

Once a user has created a pre-redacted graph 164 representing results of the current investigation 162, the user can use the graph application 130 to publish the pre-redacted graph 164 to the graph repository 160 as a redacted graph 161 where it can be retrieved by other users into their own investigations 162 for continuing analysis.

In some embodiments, the graph publishing process begins with the publishing user specifying a set of individual users that are expected to retrieve the redacted graph 161 from the shared graph repository 160. This set of users is referred to hereinafter as the set of "target users". In some embodiments, the publishing user specifies the set of target users by entering identifiers of the target users and/or identifiers of collaboration teams through a user interface driven by the graph application 130. A collaboration team is a named collection of individual users, akin to a mailing list.

Next, the graph application 130 determines a common access control level of the set of target users. In some embodiments, the common access control level is the set of access control groups that each and every target user belongs to and the set of access control classifications that each and every target user has. In some embodiments, the common access control level is the intersection of the set of access control groups that each and every target user belongs to and the set of access control groups of the investigation authorization 165 associated with the investigation 162, and the intersection of the set of access control classifications that each and every target user has and the set of access control classifications of the investigation authorization 165 associated with the investigation 162.

In some embodiments, determining the common access control level of the set of target users involves the graph application 130 consulting the user access control level information 152 to determine, for each target user, the set of access control groups the target user belongs to and the set of access control classifications the target user has. In this case, two intersections are computed. One intersection is the intersection of the sets of access control groups for the target users (the "common access control groups of the target users"). The other intersection is the intersection of the sets of access control classifications for the target users (the "common access control classifications of the target users").

In some embodiments, the common access control level is the set of common access control groups of the target users and the set of common access control classifications of the target users. In some embodiments, common access control groups of the target users that are subordinate or subsumed by common access control groups of the target users higher in the access control level hierarchy are not included in the common access control level. Similarly, in some embodiments, common access control classifications of the target users that are subordinate or subsumed by common access control classifications of the target users higher in the access control level hierarchy are not included in the common access control level.

In some embodiments, the common access control level is (a) the intersection of the set of common access control groups of the target users (possibly omitting subordinate or subsumed groups) and the set of access control groups of the investigation authorization 165 associated with the investigation 162, and (b) the intersection of the set of common access control classifications of the target users (possibly omitting subordinate or subsumed classifications) and the set of access control classifications of the investigation authorization 165 associated with the investigation 162. By these intersections with the investigation authorization 165 associated with the investigation 162, the preview of the redacted graph presented to the publishing users does not present nodes, edges, and presentation elements that cannot be viewed by the set of target users because of the investigation authorization 165 associated with the investigation 162.

In some embodiments, instead of beginning the graph publishing process by specifying a set of individual users and/or collaboration teams that are expected to retrieve the redacted graph 161 from the shared graph repository 160, the user begins the graph publishing process instead by providing a template file that directly specifies the common access control level.

Next, whether the common access control level is determined indirectly from a set of specified users/collaboration teams or determined directly from a template file, the graph application 130 iterates over the graph components (i.e., nodes, edges, and presentation elements) of the pre-redacted graph 164 to determine, for each such graph component, whether a hypothetical user with the common access control level can view the component based on the access control information 157 associated with the data object 154, link 156, or presentation element 166 that the graph component represents. If the hypothetical user with the common access control level could not view the component, then the component will be redacted in the redacted graph 161 published to the shared graph repository 160. In particular, the pre-redacted graph 164 may be published as the redacted graph 161 based on the graph state information for the pre-redacted 164 but without graph state information for the components that were redacted.

Before publishing the pre-redacted graph 164 as the redacted graph 161 to the shared graph repository 160, the graph application 130 displays a visualization of the redacted graph 161 on the publishing user's video display so that the publishing user can view how the redacted graph 161 will be displayed to a user with the common access control level. By doing so, the publishing user can confirm, before publishing the redacted graph 161 to the shared data repository 160, that publishing the redacted graph 161 will not constitute an information leakage and at the same time will provide information useful to others' investigations 162.

Graph Sharing Methodology

Figure 2:
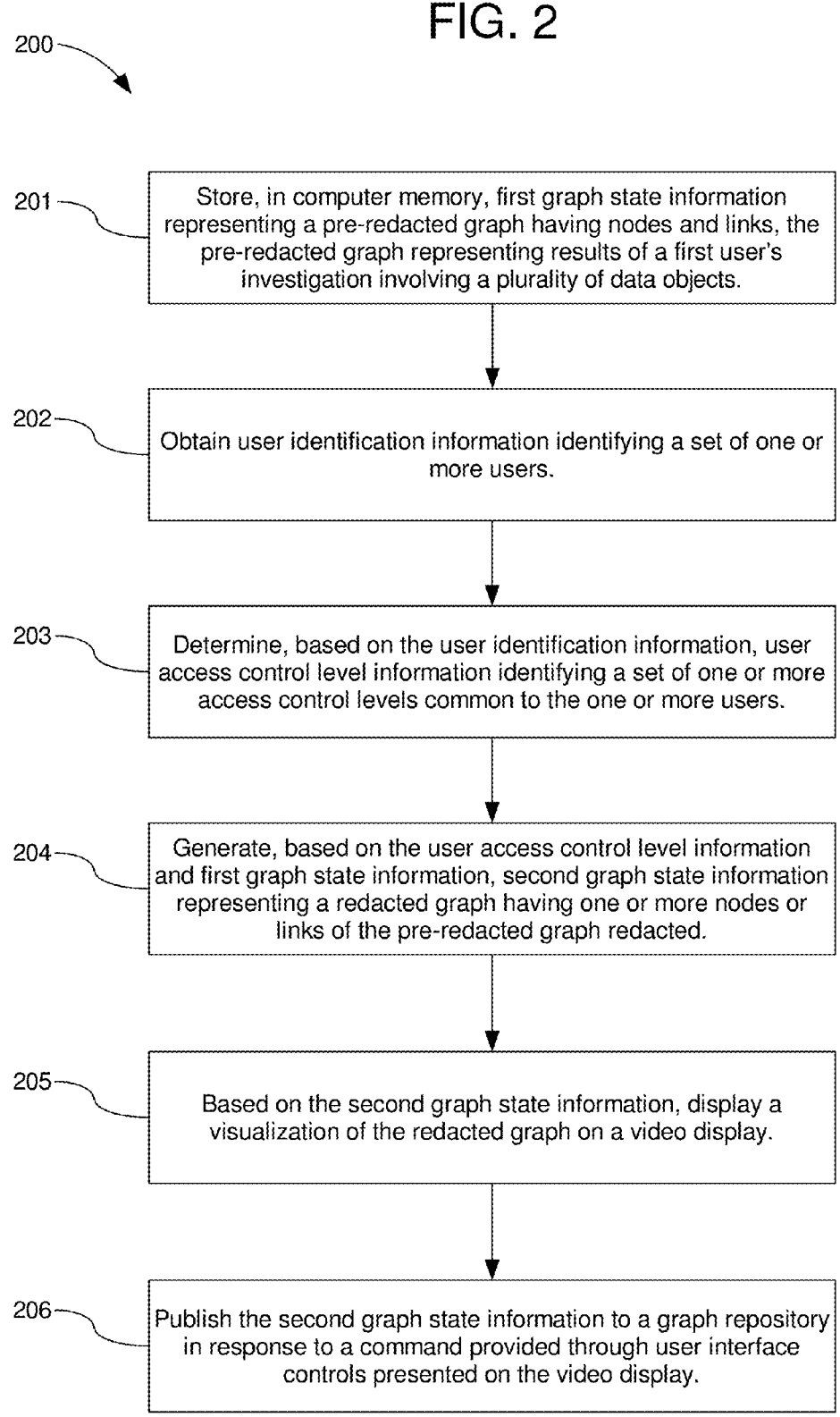
FIG. 2 is a flowchart of a methodology for sharing investigation results that may be performed by the graph sharing application of the investigative analysis system.

FIG. 2 is a flowchart of a graph sharing methodology 200 according to some embodiments. The methodology 200 may be performed by the server computing devices that operate the graph application 130. Alternatively, the methodology 200 may be performed by a client computing device at a user site 101, in which case, the graph application 130 operates on the client computing device. As yet another alternative, the methodology 200 may be performed by a combination of a client computing device at a user site 101 and one or more server computing devices that operate the graph application 130, in which case, a portion of the graph application 130 operates on the client computing device.

For ease of understanding, the steps of the graph sharing methodology 200 are depicted and described as being performed in a certain order. However, it will be understood by those skilled in the art that where a step is not dependent on results of another step or steps, that step may be performed in a different order or performed concurrently with respect to other steps.

At block 201, the graph application 130 stores, in database 150, first graph state information representing a pre-redacted graph 164 having nodes, edges, and presentation elements 166. The pre-redacted graph 164 represents result of a first user's investigation involving data objects 154, properties 155, links 156, and presentation elements 166 that are the subject of the first user's investigation 162. The first graph state information points to or references the data objects 154, links 156, and presentation elements 166 in the first user's investigation subset 163.

In some embodiments, the first graph state information has information representing the nodes, edges, and presentation elements of the pre-redacted graph 164 including information for displaying the nodes, edges, and presentation elements in a visible graph arrangement on a video display. For each node of the pre-redacted graph 164, there is information in the first graph state information that points to or references the data object 154 in the first user's investigation subset 163 that is represented by the node. In addition, for each edge of the pre-redacted graph 164, there is information in the first graph state information that points to or references the link 156 in the first user's investigation subset 163 that is represented by the edge. In addition, for each presentation element of the pre-redacted graph 164, there is information in the first graph state information that points to or references the presentation element 166 in the first user's investigation subset 163.

In some embodiments, the pre-redacted graph 164 may contain components other than just nodes and edges. These other non-edge and non-node components may include textual notes, property boxes, audio content, video content, audio/video content, documents, or other presentable information. The first graph state information may contain positioning information specifying where on the visible graph the non-edge and non-node components are to be displayed in relation to the node and edge components of the pre-redacted graph 164. Further, the first graph state information may contain information for each non-edge and non-node component that points to or references the database information (e.g., the text note, the property box, the audio content, the video content, the audio/video content, the document, or other presentable information) in the first user's investigation subset 163 represented by the non-edge and non-node component. Information in the first user's investigation subset 163 represented by a non-edge and non-node component of the pre-redacted graph 164 may be associated, in the first user's investigation subset 163, with access control information 157 for controlling access to the database information.

At block 202, the graph application 130 obtains user identification information identifying a set of one or more target users that the first user expects to share the pre-redacted graph 164 with. The user identification information may include a list of one or more individual user identifiers and/or a list of one or more collaboration team identifiers.

User identification information may be obtained by the graph application 130 directly from the first user. Alternatively, user identification information may be obtained from the database 150 based on information obtained directly from the first user.

At block 203, the graph application 130 determines, based on the user identification information obtained at block 202, user access control level information identifying a set of one or more access control levels common to the one or more target users that the first user expects to share the pre-redacted graph 164 with. To do so, the graph application 130 may use the user identification information to obtain, from the user access control level information 152 in the database 150, for each target user, the set of access control groups that the target user belongs to and the set of access control classifications that the target user has. From this access control level information obtained for each target user, the graph application 130 determines a common access control level for the set of target users.

At block 204, the graph application 130 generates, based on the user access control level information determined at block 203 and the first graph state information stored at block 201, second graph state information representing a redacted graph having one or more nodes, edges, or non-edge and non-node components of the pre-redacted graph 164 redacted. Generally, this involves the graph application 130 creating a copy of the first graph state information with information representing the redacted nodes, edges, and non-edge and non-node components removed in the second graph state information. To determine which nodes, edges, and non-edge and non-node components of the pre-redacted graph 164 to redact, the graph application 130 iterates over the nodes, edges, and non-edge and non-node components of the pre-redacted graph 164 comparing the version of the access control information 157 associated with the database information represented by the node, edge, or non-edge and non-node component stored in the first user's investigation subset 163 with the common access control level determined for the set of target users. In some embodiments, if the common access control level gives permission to view the database information represented by a node, edge, or non-edge and non-node component, then information representing the node, edge, or non-edge and non-node component in the first graph state information is retained in the second graph state information.

In some embodiments, to view a data object 154, a link 156, or other database information represented by a non-edge and non-node component, the common access control level must include all classifications required by the access control list 158 associated with the data object 154, the link 156, or the other database information, and must have at least the discover permission, according to the access control group information of the associated access control list 158 and the access control groups of the common access control level. Other requirements for viewing are possible and embodiments are not limited to any particular set of requirements. For example, a user with the common access control may be required to have the read permission instead of just the discover permission.

In some embodiments, a node of the pre-redacted graph 164 corresponding to a data object 154 in the first user's investigation subset 163 is not redacted from the pre-redacted graph 164 so long as at least one data property 155 of the data object 154 is viewable according to the common access control level.

In some embodiments, a pre-redacted graph 164 may include a group node which represents a set of two or more data objects 154 in the first user's investigation subset 163. In some embodiments, a group node of the pre-redacted graph 164 corresponding to data objects 154 in the first user's investigation subset 163 is not redacted from the pre-redacted graph 164 so long as at least one of the data objects 154 of the group is viewable to the common access control level. View-ability of a data object 154 of the group may be determined based on the properties 155 of the data object 154 as discussed in the previous paragraph.

In some embodiments, an edge of the pre-redacted graph 164 corresponding to a link 156 in the first user's investigation subset 163 is redacted if not viewable to the common access control level.

In some embodiments, an edge of the pre-redacted graph 164 is also redacted if the common access control level cannot view both data objects 154 that the corresponding link 156 connects even if the common access control level has permission to view the corresponding link 156. View-ability of a data object 154 connected by a link 156 may be determined based on the properties 155 of the data object 154 as discussed in a previous paragraph above.

In some embodiments, an edge of the pre-redacted graph 164 corresponds to more than one link 156 in the first user's investigation subset 163. In this case, the edge may not be redacted so long as at least one of the links 156 is viewable by the common access control level. However, the edge may be redacted even if one of the links 156 is viewable by the common access control level when both data objects 154 that the links 156 connect are not viewable by the common access control level.

At block 205, the graph application 130 presents a visualization of the second graph state information to the first user on the first user's video display. This visualization may be a graph representation of the pre-redacted graph 164 but with the nodes and edges redacted at block 204 not displayed.

At block 206, the graph application 130 publishes the second graph state information representing a redacted graph 161 to the shared graph repository 160 in response to a command provided by the first user through user interface controls presented on the first user's video display. Once published, other users of the graph application 130 can bring the redacted graph 161 into their own investigations 162 for continuing analysis.

In some embodiments, publication of the second graph state information to the shared graph repository 160 coincides with publication of the investigation subset 163 back to the shared data repository 153. In some embodiments, if there are data change conflicts between the versions of the data objects 154 and links 156 in the investigation subset 163 and the versions of the those data objects 154 and links 156 in shared data repository 153 at the time of publication, the data change conflicts must be resolved in the investigation subset 163, either manually or automatically, before the second graph state information is published to the shared graph repository 160. Such data changes conflicts include any conflicts between access control information 157 associated with those data objects 154 and links 156 in the investigation subset 163 and access control information 157 associated those data objects 154 and links 156 in the shared data repository 153. In the case of data change conflicts, after the data change conflicts have been resolved, the methodology 200 may return to block 204 to generate new second graph state information based on the updated investigation subset 163 containing the results of the conflict resolutions.

Example Graph Sharing User Interfaces

Figure 3A:
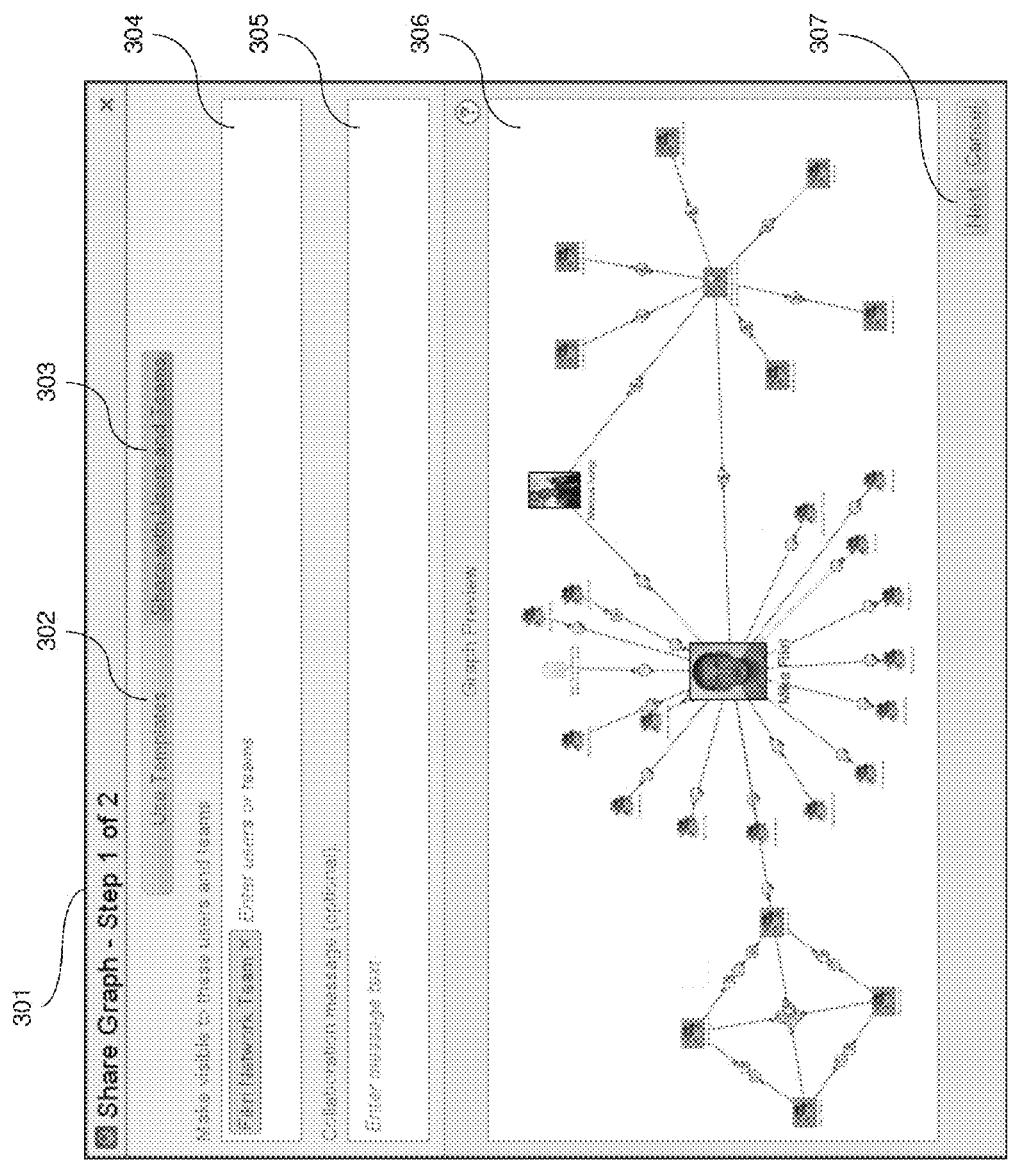
FIGS. 3A-D are examples of graph sharing user interface dialogs for publishing a redacted graph to a shared graph repository of the investigative analysis system.
Figure 3B:
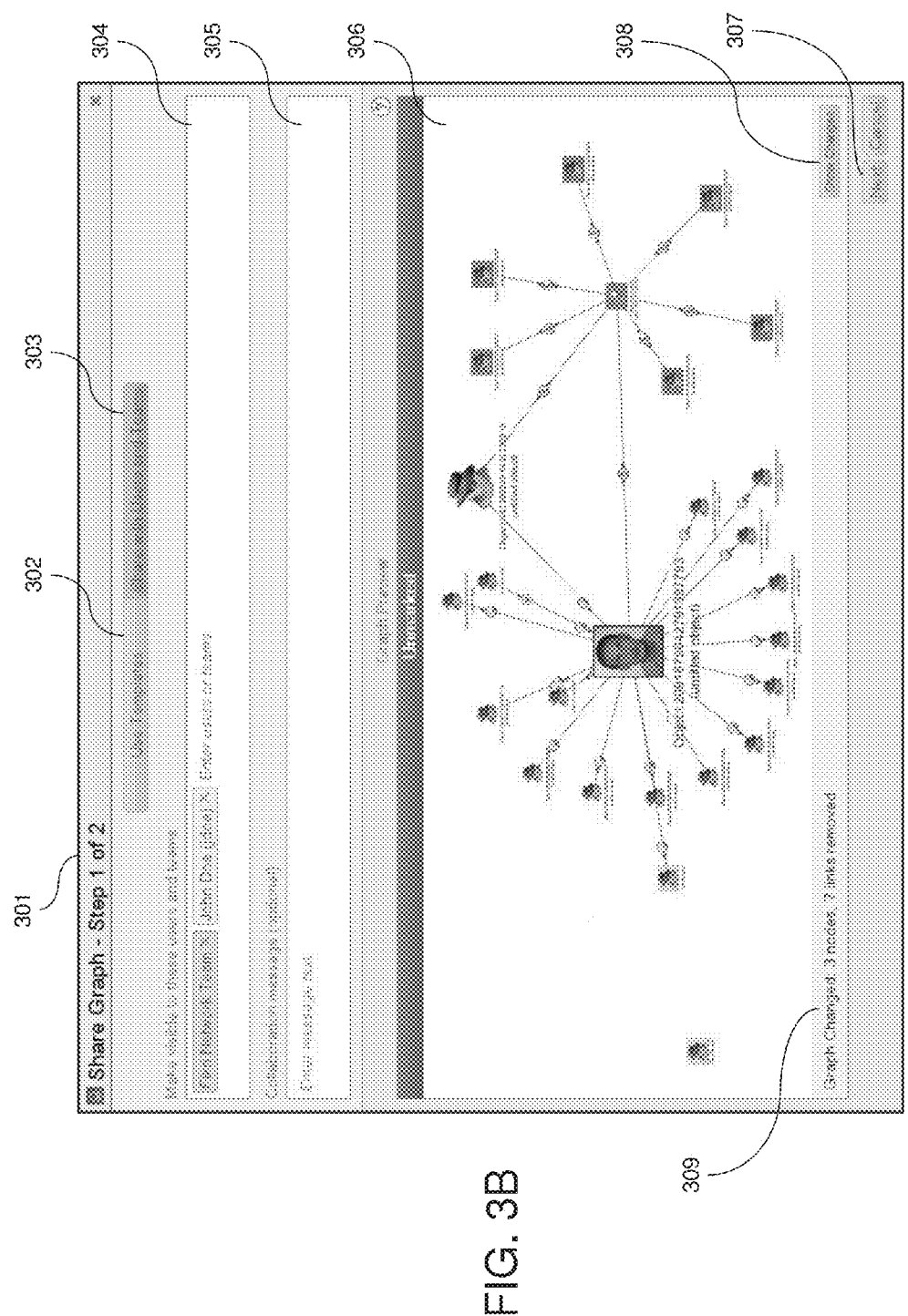
Figure 3C:
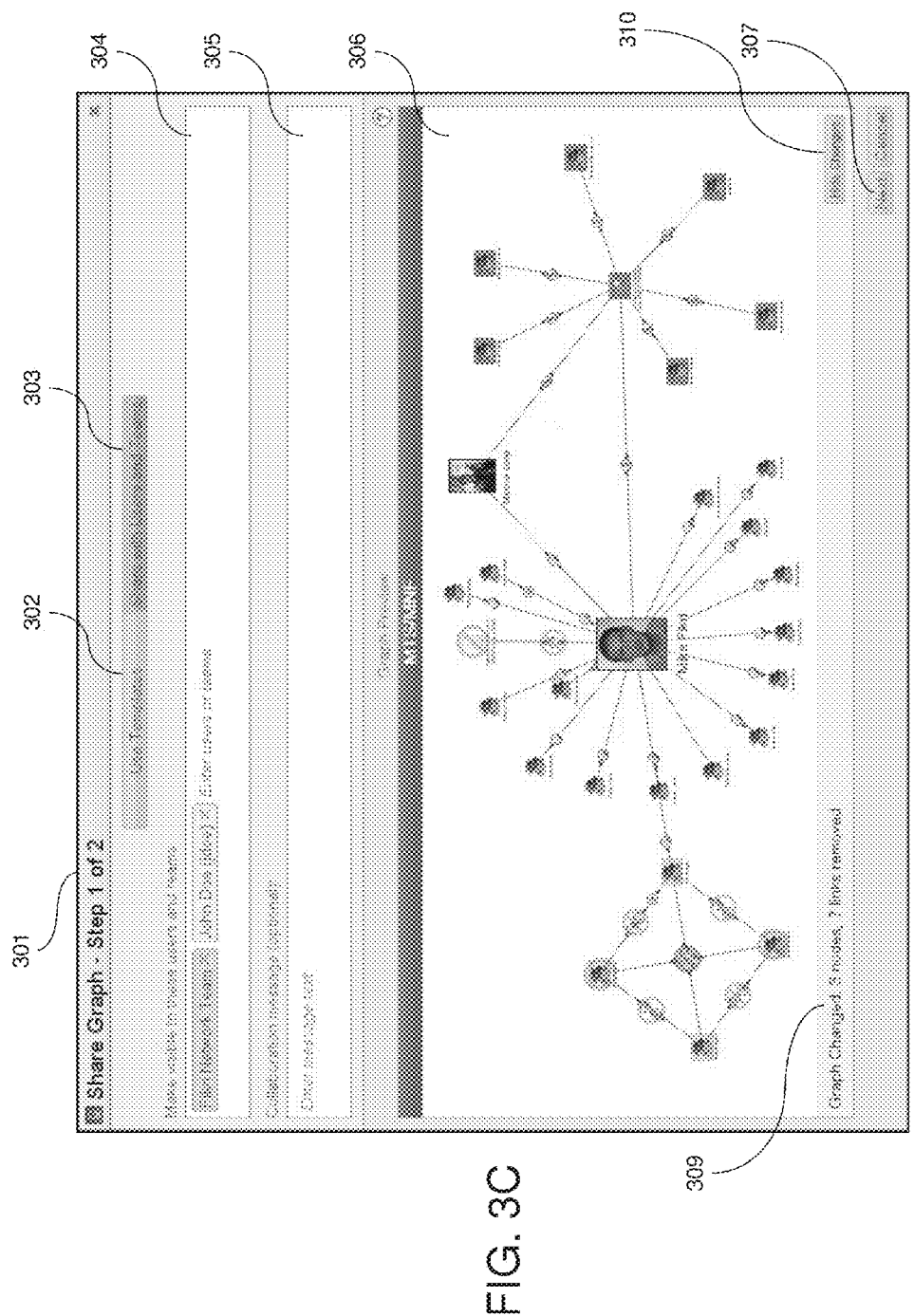

FIG. 3A, FIG. 3B, FIG. 3C are exemplary graph sharing user interfaces that may be driven by the graph application 130 for sharing a pre-redacted graph 164 of an investigation 162 with other graph application 130 users according to an embodiment. The user interfaces of FIGS. 3A-C may be presented on a video display at a user site 101 operatively coupled to the graph application 130.

In FIG. 3A, there is shown a graphical user interface dialog 301 displaying, in the graph preview pane 306, a selected pre-redacted graph 164 to be shared. The dialog 301 includes a "use templates" button 302 which, when selected, allows the user to specify a template file containing a list of users and/or collaboration teams representing the users that the pre-redacted graph 164 is to be shared with. In addition to or instead of a list of users and/or collaboration teams, the template can specify a set of access control groups and/or classifications, as described above. Alternatively, the user can specify the individual users and collaboration teams in the entry panel 304 when the "share with users and teams" button 303 is selected. The dialog 301 also includes a message field 305 for entering optional collaboration message information.

As shown in FIG. 3B, in an embodiment, as the user enters individual users and/or collaboration teams in the entry panel 304, the graph application 130 automatically redacts nodes and edges of the pre-redacted graph 164 that are not visible to all users specified in the entry area 304. In the example of FIG. 3B, as indicated in the graph redaction status panel 309, the collaboration team ("Fikri Network Team") and the individual user ("John Doe") entered into the entry panel 304 causes three nodes and seven edges to be redacted from the pre-redacted graph 164 shown in FIG. 3A. In FIG. 3B, the redacted graph displayed in the preview area 306 removes display of the redacted nodes and edges. Alternatively, as in FIG. 3C, the redacted graph is displayed with the redacted nodes edges visible but with redaction indicators. In the current example, the redaction indicators are circles with a diagonally orientated intersects that overlay the redacted nodes and edges. However, other redaction indicators are possible and embodiments are not limited to the indicators shown in FIG. 3C. In general, any visual indication that visually distinguishes a redacted node or edge from a non-redacted node or edge may be used. The user can operate the "show changes" button 308 and the "hide changes" button 310 to toggle between the two preview displays.

Figure 3D:
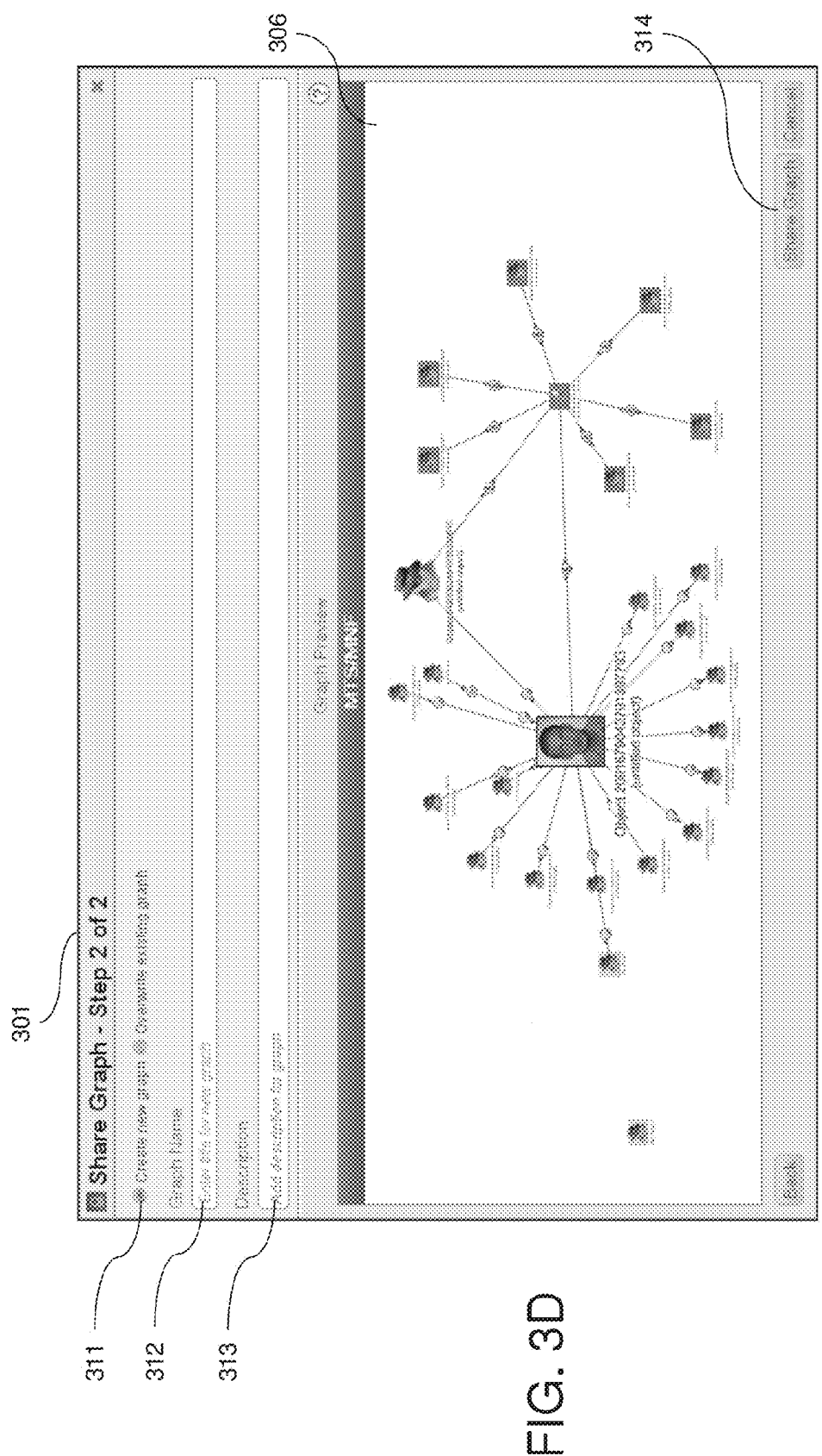

Once the user has finished entering users and/or collaboration teams into the entry panel 304 or provided a template and the user is satisfied with the redacted version of the graph displayed in the graph preview area 306, the user may select the "next" button 307 to reveal the dialog 301 shown in FIG. 3D. Here, the user may operate one of the radio buttons 311 to publish the redacted graph previewed in the preview area 306 to the shared graph repository 160 as a new redacted graph or to replace an existing redacted graph in the shared graph repository 160. If the "overwrite existing graph" radio button 311 is selected, the dialog 301 may present user interface controls for selecting and/or searching for the redacted graph in the shared graph repository 160 to overwrite. If the "create new graph" radio button 311 is selected, the user may provide a name for the new graph in the text entry area 312 and a description of the new graph in the text entry area 313. When finished, the user may operate the "share graph" button 314 to publish graph state information representing the redacted graph previewed in the preview area 306 to the shared graph repository 160.

Figure 4:
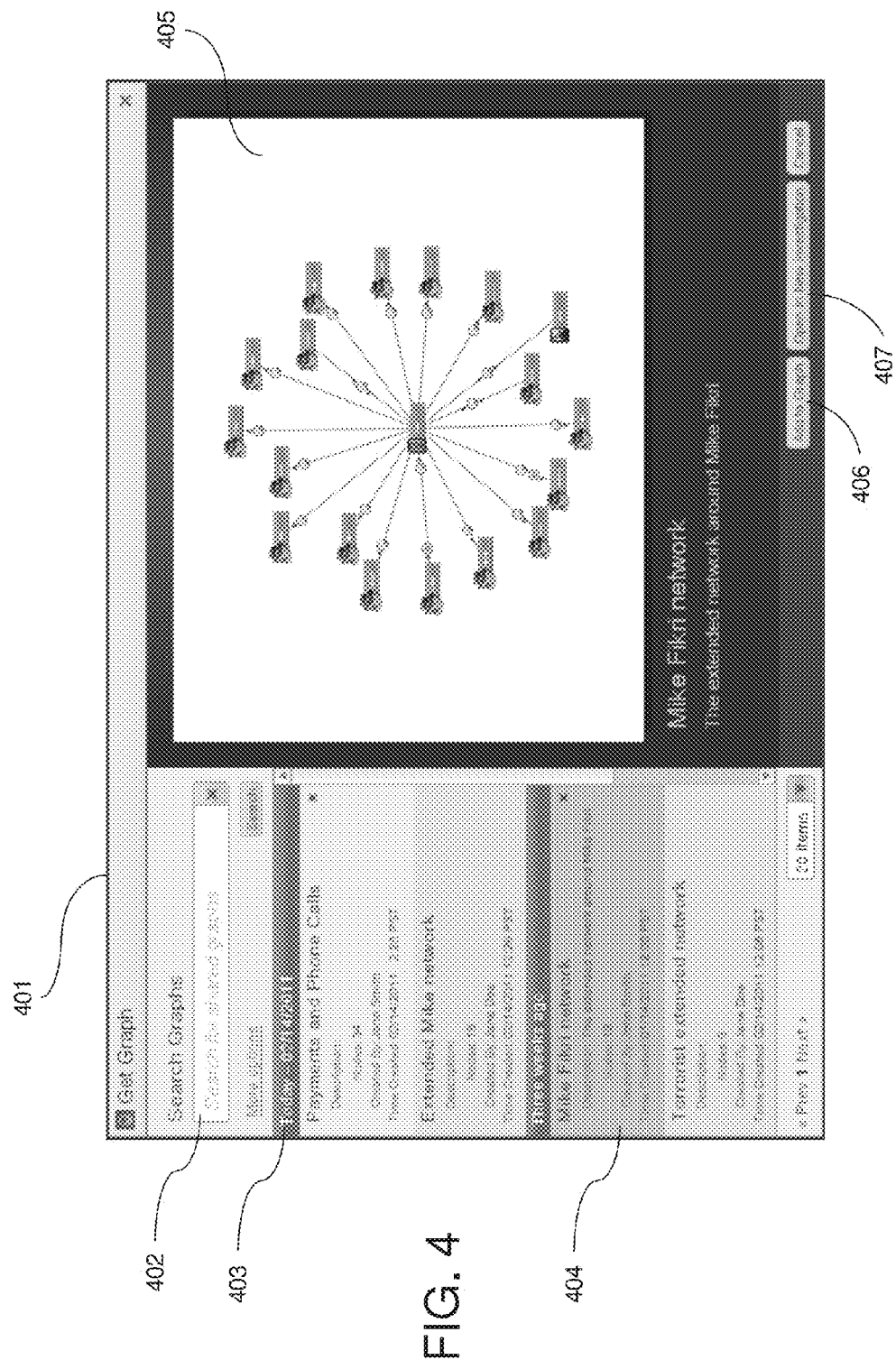
FIG. 4 is an example of a graph sharing user interface dialog for getting a redacted graph from the shared graph repository of the investigative analysis system.

FIG. 4 includes an exemplary user interface that may be presented on a video display to a user at a user site 101 for retrieving a previously published redacted graph 161 in the shared graph repository 160 into the user's investigation 162 as a pre-redacted graph 164. The user interface may be driven by the graph application 130 and includes a user interface dialog 401. The dialog 401 allows the user to choose a published redacted graph 161 from a list 403 of published redacted graphs 161 available to the user stored in the shared graph repository 160. In the published redacted graphs list 403, the user can select a list item 404 to preview the corresponding redacted graph 161 in the graph preview area 405. When the user has selected a list item 404 corresponding to the published redacted graph 161 of interest to the user, the user can operate the "add to graph" button 406 to bring the published redacted graph 161 into the user's current investigation 162 as a pre-redacted graph 164. Alternatively, the user can operate the "open in new investigation" button 407 to create a new investigation 162 and bring the published redacted graph 161 into the new investigation 161 as a pre-redacted graph 164.

Sample Computer System

Figure 5:
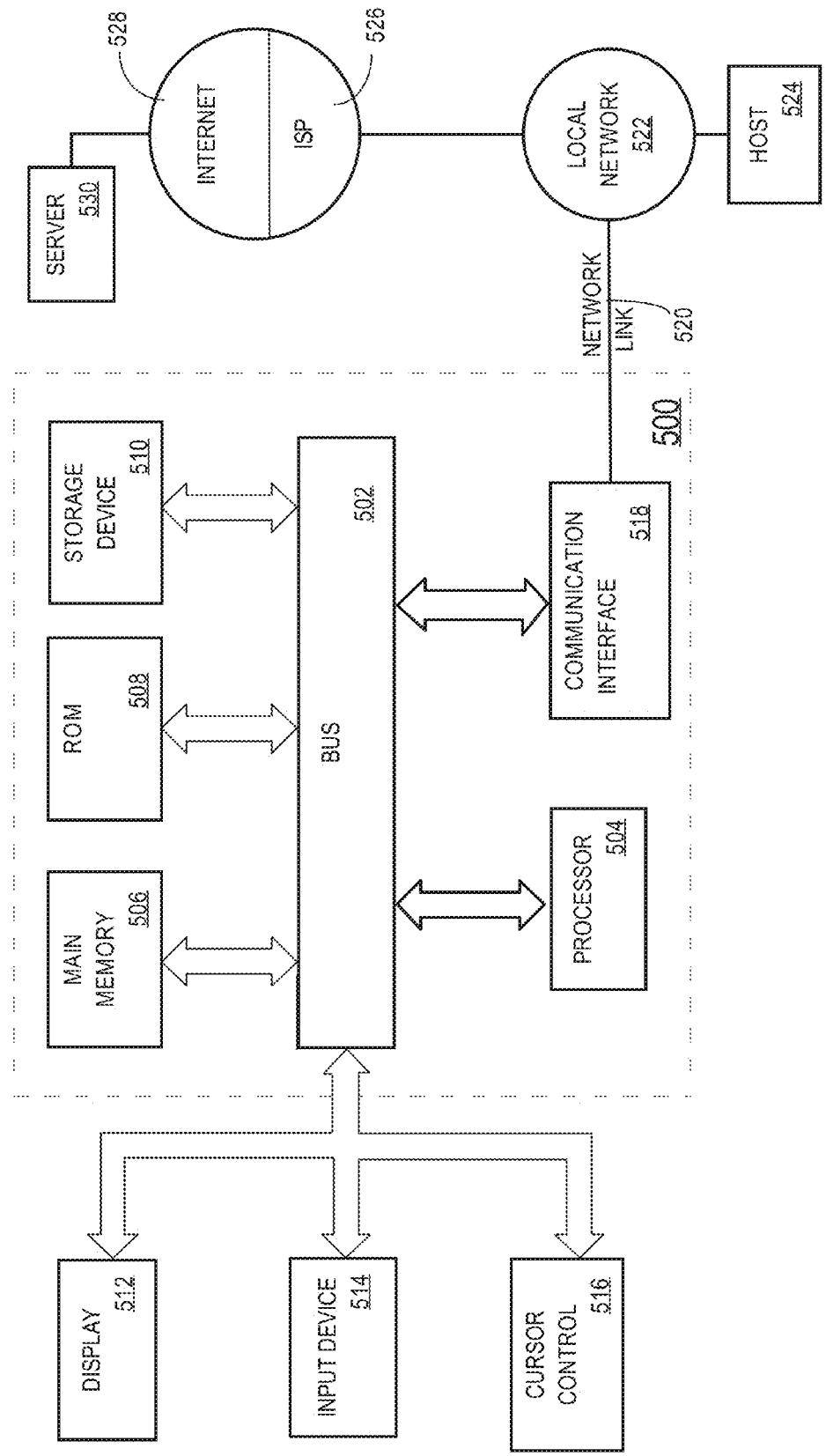
FIG. 5 is a block diagram of a sample computer system on which embodiments of the present invention may be implemented.

FIG. 5 is a block diagram that illustrates a computer system 500 upon which embodiments of the present invention may be implemented. Computer system 500 includes a bus 502 or other communication mechanism for communicating information, and one or more hardware processors 504 coupled with bus 502 for processing information. A hardware processor 504 may be, for example, a general purpose microprocessor.

Computer system 500 also includes a main memory 506, such as a random access memory (RAM) or other dynamic storage device, coupled to bus 502 for storing information and instructions to be executed by processor(s) 504. Main memory 506 also may be used for storing temporary variables or other intermediate information during execution of instructions to be executed by processor(s) 504. Such instructions, when stored in non-transitory media accessible to processor(s) 504, render computer system 500 into a special-purpose computing device that is customized to perform the operations specified in the instructions. For purposes of this description, main memory 506 includes any non-volatile memory used to implement virtual memory.

Computer system 500 may further include a read only memory (ROM) 508 or other static storage device coupled to bus 502 for storing static information and instructions for processor(s) 504. One or more storage device(s) 510, such as magnetic disks, optical disks, or solid-state drives, may be provided and coupled to bus 502 for storing information and instructions.

Computer system 500 may be coupled via bus 502 to a display 512, such as a liquid crystal display (LCD), for displaying information to a computer user. One or more input device(s) 514, including alphanumeric and other keys, a touch panel, physical buttons, a mouse, a trackball, a cursor control device, or other input device may be coupled to bus 502 for communicating information and command selections to processor(s) 504. Where an input device 514 is a touch panel, the touch panel may be physically integrated with the display 512, for example as a resistive or capacitive sensing touch panel overlay on an LCD screen, for detecting the presence and location of touch within the display 512 area.

Computer system 500 may implement the techniques described herein using customized hard-wired logic, one or more ASICs or FPGAs, firmware and/or program logic which in combination with the computer system causes or programs computer system 500 to be a special-purpose machine. The techniques herein may be performed by computer system 500 in response to processor(s) 504 executing one or more sequences of one or more instructions contained in main memory 506. Such instructions may be read into main memory 506 from another storage medium, such as storage device(s) 510. Execution of the sequences of instructions contained in main memory 506 causes processor(s) 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device(s) 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor(s) 504 for execution. For example, the instructions may initially be carried on a magnetic disk or solid-state drive of a remote computer. The remote computer can load the instructions into its dynamic memory and send the instructions over wired (e.g., twisted pair, coaxial cable, optical fiber, etc.) or wireless (e.g., microwave, satellite, cellular, radio, etc.) networks. A network communications device local to computer system 500 can receive the data on the network and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the instructions. The instructions received by main memory 506 may optionally be stored on storage device(s) 510 either before or after execution by processor(s) 504.

Computer system 500 also includes one or more communication interface(s) 518 coupled to bus 502. Communication interface(s) 518 sends and receives electrical, electromagnetic or optical signals that carry digital data streams representing various types of information. Communication interface(s) 518 provides a two-way data communication coupling to a network link 520 that is connected to a wired or wireless local network 522. For example, communication interface(s) 518 may include a modem, an integrated services digital network (ISDN) card, an Ethernet card, a cable modem, a satellite modem, an IEEE 802.11 or other Wireless Local Area Network (WLAN) interface, a 3G, 4G, or other cellular network interface, or other network interface for communicating on wired or wireless local network 522.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program instructions, through the network(s), network link 520 and communication interface(s) 518. In the Internet example, a server 530 might transmit a requested instructions for an application program through Internet 528, ISP 526, local network 522 and communication interface(s) 518.

The received instructions may be executed by processor(s) 504 as it is received, and/or stored in storage device(s) 510, or other non-volatile storage for later execution.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A computer-implemented method, comprising:
    storing first graph state information representing a pre-redacted graph having nodes and edges;
    wherein the pre-redacted graph represents results of a first user's investigation involving a plurality of data objects and links therebetween;
    wherein a particular edge of the pre-redacted graph corresponds to a particular link connecting a first data object of the plurality of data objects with a second data object of the plurality of data objects;
    wherein the plurality of data objects and the links therebetween are associated with access control lists governing access to the data objects and the links;
    causing, based on the first graph state information, a visualization of the pre-redacted graph to be displayed on a video display;
    receiving, based on user input from the first user, information that identifies a set of target users;
    in response to receiving the information that identifies the set of target users, automatically determining a common access control level of the set of target users;
    after causing the visualization of the pre-redacted graph to be displayed, automatically generating, based at least in part on the common access control level and the access control lists, second graph state information representing a redacted graph having one or more nodes or edges of the pre-redacted graph redacted;

causing, based on the second graph state information, a visualization of the redacted graph to be displayed on the video display;

wherein the visualization of the redacted graph indicates the one or more nodes or edges of the pre-redacted graph that were redacted;

after causing the visualization of the redacted graph to be displayed on the video display and responsive to receiving an indication of acceptance by the first user of the redacted graph, publishing the second graph state information to a graph repository;

wherein the method is performed by one or more computing devices.

2. The method of claim 1, wherein a particular node of the pre-redacted graph corresponds to a particular data object of the plurality of data objects, the particular data object having one or more data properties; and wherein generating the second graph state information representing the redacted graph includes determining not to include the particular node in the redacted graph in response to determining, based on the common access control level and one or more access control lists associated with the one or more data properties, that the common access control level does not have permission to view any data property of the one or more data properties of the particular data object.

3. The method of claim 1, wherein a particular group node of the pre-redacted graph corresponds to a particular set of data objects of the plurality of data objects; and wherein generating the second graph state information representing the redacted graph includes determining not to include the particular group node in the redacted graph in response to determining, based on the common access control level and one or more access control lists associated with the particular set of data objects, that the common access control level does not have permission to view a data object of the particular set of data objects.

4. The method of claim 1, wherein a second particular edge of the pre-redacted graph corresponds to a second particular link connecting a third data object of the plurality of data objects with a fourth data object of the plurality of data objects; and wherein generating the second graph state information representing the redacted graph includes determining not to include the second particular edge in the redacted graph in response to determining, based on the common access control level and one or more access control lists associated with the second particular link, that the common access control level does not have permission to view the second particular link.

5. The method of claim 1, wherein each access control list, of the access control lists associated with the data objects and the links, specifies one or more access control groups and associated permissions.

6. The method of claim 1, wherein determining a common access control level includes determining the common access control level from a template file provided by a user.

7. The method of claim 1, wherein determining the common access control level includes determining, for each target user of the set of target users, a set of one or more access control groups to which the target user belongs; and determining an intersection of the determined sets of one or more access control groups to which the set of target users belong.

8. The method of claim 1,
wherein determining the common access control level includes:
determining, for each target user of the set of target users, a set of one or more access control groups to which the target user belongs;
determining a first intersection of the determined sets access control groups to which the set of target users belong; and
determining a second intersection of the first intersection and a set of one or more access control groups of an investigation authorization associated with the first user's investigation.

9. The method of claim 1, wherein the common access control level consists of a set of one or more access control groups.

10. The method of claim 1, wherein the common access control level consists of a set of one or more access control groups and a set of one or more access control classifications.

11. The method of claim 1, wherein the pre-redacted graph has one or more presentation elements; and wherein each of the presentation elements of the one or more presentation elements is of a presentation element type selected from the group consisting of a text note, digital audio content, digital video content, digital audio/video content, or a document.

* * * * *